H. A. BORRESEN.
CENTERING DEVICE FOR SCREW DRIVERS.
APPLICATION FILED OCT. 14, 1907.
1,126,370.
Patented Jan. 26, 1915.
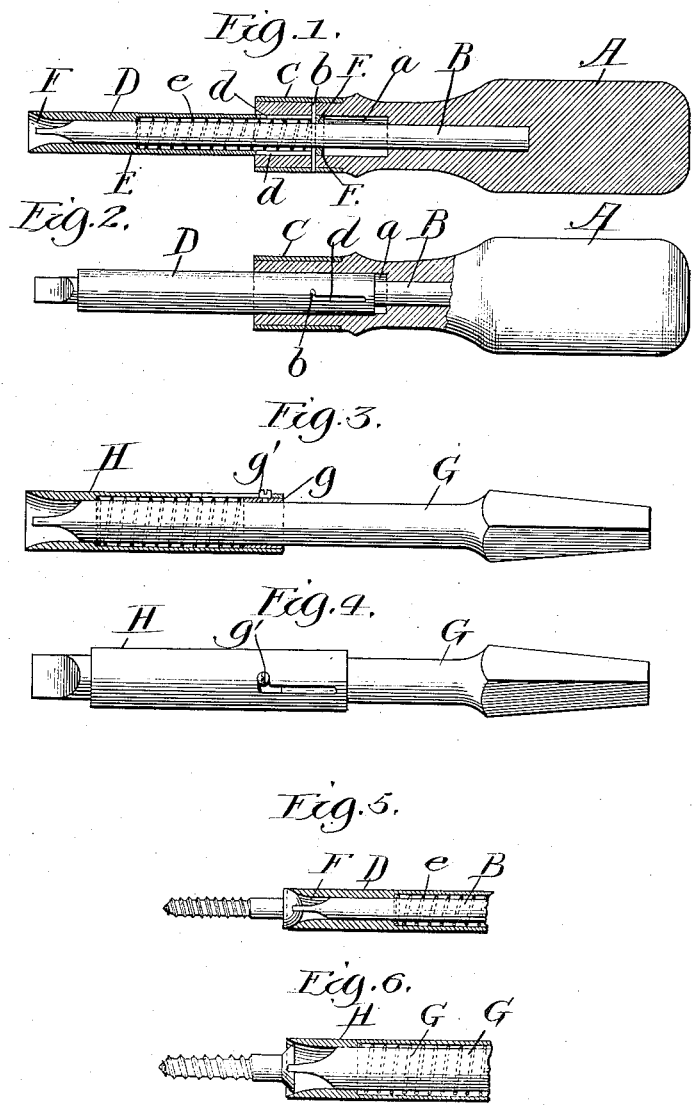

UNITED STATES PATENT OFFICE.

HELGE A. BORRESEN, OF MARQUETTE, MICHIGAN, ASSIGNOR TO MAX W. ZABEL, TRUSTEE, OF CHICAGO, ILLINOIS.

CENTERING DEVICE FOR SCREW-DRIVERS.

1,126,370.  Specification of Letters Patent. Patented Jan. 26, 1915.

Application filed October 14, 1907. Serial No. 397,331.

*To all whom it may concern:*

Be it known that I, HELGE A. BORRESEN, a citizen of the United States, and resident of Marquette, Marquette county, State of Michigan, have invented certain new and useful Improvements in Centering Devices for Screw-Drivers, of which the following is a full, clear, and exact specification.

My invention relates to screw-driving tools and its particular object is to provide means whereby the head of a screw may be held in proper relation to the blade of the said tool in such manner that the possibility of the latter slipping off the slotted head of the screw is avoided. This device is so constructed that it is readily adapted for use in connection with tools of various types such as the ordinary hand operated devices, the brace and bit drivers, or the automatic or "push screw-driver," and can be used successfully on each as the case may be. This I accomplish by the means hereinafter fully described and as more particularly pointed out in the claims.

In the drawings:—Figure 1 is a central longitudinal section of any ordinary hand-operated screw-driver having my invention applied thereto. Fig. 2 is a side elevation thereof having a portion of the handle shown in section. Fig. 3 is a central longitudinal section of my invention as applied to a screw-driving bit. Fig. 4 is a side elevation thereof showing the device turned at right angles to Fig. 3. Figs. 5 and 6 are fragmental views in longitudinal section showing the devices in operative engagement with the head of a screw.

Referring to the drawings, A represents the handle of an ordinary screw-driver that has a shaft B fitted into its end as shown and which is retained therein by means of a pin *b* passing through the same together with the handle and the ferrule C. The bore of the end of this handle is slightly enlarged in diameter as shown to form a recess *a* to receive a suitable sliding sleeve D. This sleeve D is preferably cylindrical in shape so as to surround the shaft of the screw-driver and is of such length that when in its normal operative position its outer end will extend past the end of the blade. Near its inner end it is provided with diametrically opposite longitudinal slots *d* (preferably made bayonet or L-shaped) in which the retaining pin *b* is adapted to operate and which is adapted to lock the sleeve out of its normal position when it is desired to use the tool in the customary manner. The bore of this sleeve next the handle is preferably increased in diameter as shown to provide shoulders or stops E, E, for a coil-expansion spring *e* surrounding the shaft of the driver. At its outer end the bore of this sleeve is preferably tapered or countersunk to form a conical seat F for the head of the screw to be operated upon.

In the device shown in Figs. 3, 4, and 6 the construction of the sleeve H is substantially the same as sleeve D of the first-described device excepting that the shoulders E on the upper end thereof are omitted and in lieu thereof the bit G is provided with a collar *g* secured thereto by a set screw *g'*, which collar is adapted to perform the same function as the shoulders by closing the upper end of the bore of the sleeve, while the set screw acting in the slot guides the sleeve the same as the pin *b* hereinbefore described.

In operation, when it is desired to insert a screw the tapered blade of the screw-driver is placed in the slot in the head of the screw in the usual manner and the head of the screw is seated in the countersunk end of the sleeve as shown in Figs. 5 and 6. The handle or stock is then rotated and the screw is driven home.

Should it be desirable or necessary to use this screw-driving tool in the ordinary fashion the sleeve is adapted to be slid back upon the shaft or bit as the case may be and turned slightly until the guiding member engages and seats in the lateral off-set portion of the slot and temporarily held in a raised position exposing the blade of the tool.

What I claim as new is:—

1. A device of the character described having a rod, a collar provided upon said rod, a spring acting against said collar, a single onepiece sleeve surrounding said rod having means acting against said spring, and a flaring mouth to accommodate different sized screws, a set screw for holding said collar to said rod, and a slot in said sleeve co-acting with said set screw to permit the said sleeve to be permanently retracted periodically to expose the screw driving edge of said rod, said set screw and rod coöperating to rotate said sleeve conjointly with said rod.

2. A device of the character described having a rod, a collar provided upon said rod, a spring acting against said collar, a single onepiece sleeve surrounding said rod having means acting against said spring, and a flaring mouth to accommodate different sized screws, a pin for holding said collar to said rod, a slot in said sleeve co-acting with said pin to permit the said sleeve to be permanently retracted periodically to expose the screw driving edge of said rod, said pin and rod coöperating to rotate said sleeve conjointly with said rod, and a handle having a bore for holding said rod.

3. A device of the character described having a rod, a collar provided upon said rod, a spring acting against said collar, a single onepiece sleeve surrounding said rod having means acting against said spring, and a flaring mouth to accommodate different sized screws, a pin for holding said collar to said rod, a slot in said sleeve co-acting with said pin to permit the said sleeve to be permanently retracted periodically to expose the screw driving edge of said rod, said pin and rod coöperating to rotate said sleeve conjointly with said rod, and a handle having a bore for holding said rod, a portion at least of said bore being of sufficient diameter to accommodate said sleeve.

In testimony whereof I have hereunto set my hand and seal this 2d day of October, 1907.

HELGE A. BORRESEN. [L. S.]

Witnesses:
BENJ. T. ROODHOUSE,
HELEN S. SHEDD.